(12) United States Patent
Hahm et al.

(10) Patent No.: US 7,195,364 B2
(45) Date of Patent: Mar. 27, 2007

(54) BACKLIGHT APPARATUS REDUCED IN THICKNESS

(75) Inventors: Hun Joo Hahm, Sungnam (KR); Hyung Suk Kim, Suwon (KR); Jung Kyu Park, Gwanak-ku (KR); Ho Sik Anh, Suwon (KR); Young Sam Park, Songpa-ku (KR); Bum Jin Kim, Boochun (KR); Young June Jeong, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 59 days.

(21) Appl. No.: 11/059,406

(22) Filed: Feb. 17, 2005

(65) Prior Publication Data
US 2006/0083019 A1    Apr. 20, 2006

(30) Foreign Application Priority Data
Oct. 20, 2004  (KR) ............... 10-2004-0084122

(51) Int. Cl.
*G01D 11/28*  (2006.01)
(52) U.S. Cl. ............... 362/27; 362/612; 362/613; 362/618; 362/97; 349/65; 349/68

(58) Field of Classification Search ........... 362/27, 362/97, 240, 800, 612, 613, 618; 349/65, 349/68
See application file for complete search history.

(56) References Cited

U.S. PATENT DOCUMENTS 6,883,950 B2 *  4/2005  Adachi et al. .............. 362/27
6,969,189 B2 * 11/2005  Lee et al. .................. 362/612

* cited by examiner

*Primary Examiner*—Stephen F Husar
(74) *Attorney, Agent, or Firm*—Lowe Hauptman & Berner

(57) ABSTRACT

In a backlight apparatus for an LCD, a plurality of bar-shaped first LED light sources are arranged on the reflective plate to laterally emit light. A plurality of light shades are arranged above the first light sources. A transparent plate is placed above the light shades. Scattering patterns are formed in the bottom of the transparent plate in positions corresponding to the light shades. A bar-shaped second LED light source is arranged at a side of the transparent plate to emit light into the transparent plate. The light source arranged at the side of the transparent plate prevents the formation of dark areas as a problem in the prior art, thereby enhancing the entire uniformity of light. Then, the backlight apparatus can be maintained thin even when applied to a large-sized LCD.

18 Claims, 6 Drawing Sheets

BACKLIGHT APPARATUS REDUCED IN THICKNESS

RELATED APPLICATION

The present application is based on, and claims priority from, Korean Application Number 2004-84122, filed Oct. 20, 2004.

BACKGROUND OF THE INVENTION

1. Field of the Invention

The present invention relates to a backlight apparatus in use for a Liquid Crystal Display (LCD), more particularly, which has light sources arranged at a side of a transparent plate, which is n a typical direct illumination backlight apparatus, in order to prevent the formation of dark areas as a problem in the prior art, thereby enhancing the entire uniformity of light so that the backlight apparatus can be designed thin even when applied to a large-sized LCD.

2. Description of the Related Art

LCD backlight apparatuses using Light Emitting Diodes (LEDs) illuminate an LCD panel via direct illumination or side-emitting illumination. In the side-emitting illumination, light from a light source is emitted in lateral directions and then re-directed upward via a reflective plate or a scattering pattern to illuminate the LCD panel. On the contrary, in the direct illumination, light sources are installed under the LCD panel so that light emitted laterally from the light sources are projected upward onto the LCD panel.

FIG. 1 is a schematic cross-sectional view of a conventional side-emitting backlight apparatus. As shown in FIG. 1, the side-emitting backlight apparatus includes a sheet-shaped reflective plate 12 having a scattering pattern 14 formed thereon, a light guide plate 16 placed on the reflective plate 12 and bar type LED light sources 18 and 20 placed at both sides of the light guide plate 16.

The LED light sources 18 and 20 emit light L laterally into the light guide plate 16. Then, light L propagates through the light guide plate 16, and when colliding against the scattering pattern 14, is scattered upward thereby backlighting an LCD panel 22 above the light guide plate 16.

The side-emitting backlight apparatus 10 as above advantageously has a thin and simple structure. Another advantage of this backlight apparatus is that the intensity of light directed upward can be uniformly adjusted through the design of the scattering pattern 14 formed in the top face of the reflective plate 12 or the underside of the light guide plate 16. However, this structure is not applicable to a large-sized LCD since light from the LED light sources 18 and 20 can be sent to a limited distance only.

FIG. 2 is a schematic cross-sectional view of a conventional direct-illumination backlight apparatus. The direct-illumination backlight apparatus 30 includes a sheet-shaped reflective plate 32, a plurality of bar-shaped LED light sources 34 placed on the reflective plate 32, flat light shades 36 placed on the LED light sources 34, respectively, a transparent plate 38 placed above the light shades 36 at a predetermined gap G1 and a diffuser plate 40 placed above the transparent plate 38 at a predetermined gap G2.

The LED light sources 34 emit light L substantially in horizontal directions, and emitted light L is reflected from the reflective plate 32 and passes through the transparent plate 38. Then, light L is diffused by the diffuser plate 40 to a desired uniformity to backlight an LCD panel 44 placed above the diffuser plate 40. The backlight apparatus 30 of this structure has an advantage in that it can effectively backlight a large-sized LCD since the plurality of bar-shaped LED light sources 34 are placed under the LCD panel 42.

However, the backlight apparatus 30 of this structure disadvantageously increases thickness since the gap G1 is required between the LED light sources 34 and the transparent plate 38 and the gap G2 is also required between the transparent plate 38 and the diffuser plate 40.

Describing it in more detail, when generated from the LED light sources 34, light L is reflected upward through first areas A1 and A2 between the light shades 36, such that second areas B1, B2 and B3 screened by the light shades 36 form dark areas and resultant bright lines. In order to remove the dark areas and the bright lines, the gap G2 is required to have at least a predetermined dimension to ensure a sufficient distance between the transparent plate 38 and the diffuser plate 40 so that light beams emitted upward through the first areas A1 and A2 from the transparent plate 38 can mix together before entering the diffuser plate 40.

As described above, since the gaps G1 and G2 are necessarily maintained at predetermined dimensions or more in order to impart uniformity to light directed from the reflective plate 32 toward the LCD panel 42, the direct-illumination backlight apparatus 30 essentially suffers from increase in thickness.

SUMMARY OF THE INVENTION

The present invention has been made to solve the foregoing problems of the prior art and it is therefore an object of the present invention to provide a backlight apparatus in use for an LCD having light sources arranged at a side of a transparent plate, which is generally used in a typical direct illumination backlight apparatus, in order to prevent the formation of dark areas as a problem in the prior art, thereby enhancing the entire uniformity of light so that the backlight apparatus can be designed thin even when applied to a large-sized LCD.

According to an aspect of the invention for realizing the object, there is provided a backlight apparatus arranged under an LCD panel to illuminate the LCD panel, comprising: a reflective plate; a plurality of bar-shaped first light sources each having LEDs, and arranged on the reflective plate to emit light generated by the LEDs in a lateral direction; a plurality of light shades arranged above the first light sources; a transparent plate placed above the light shades; scattering patterns formed in the bottom of the transparent plate in positions corresponding to the light shades; and a bar-shaped second light source having LEDs, and arranged at a side of the transparent plate to emit light into the transparent plate.

Preferably, the light shades may be attached to top of the first light sources, and the transparent plate may be spaced from the light shades to a predetermined gap.

Alternatively, the light shades may be attached to the bottom of the transparent plate, and the transparent plate may be spaced from the first light sources to a predetermined gap.

Preferably, the first light sources, the light shades and the transparent plates may be stacked one atop another in their order.

According to another aspect of the invention for realizing the object, there is provided a backlight apparatus arranged under an LCD panel to illuminate the LCD panel, comprising: a reflective plate; a plurality of bar-shaped first light sources each having Light Emitting Diodes (LEDs), and arranged on the reflective plate to emit light generated by the LEDs in a lateral direction; a plurality of light shades attached to the top of the first light sources, respectively; a transparent plate placed above the light shades; scattering patterns formed in the bottom of the transparent plate in positions corresponding to the light shades; and a bar-shaped second light source having LEDs, and arranged at a side of the transparent plate to emit light into the transparent plate.

According to yet another aspect of the invention for realizing the object, there is provided a backlight apparatus arranged under an LCD panel to illuminate the LCD panel, comprising: a reflective plate; a plurality of bar-shaped first light sources each having Light Emitting Diodes (LEDs), and arranged on the reflective plate to emit light generated by the LEDs in a lateral direction; a transparent plate placed above the first light sources; scattering patterns formed in the bottom of the transparent plate in positions corresponding to the first light sources; a plurality of light shades attached to the underside of the scattering patterns, respectively; and a bar-shaped second light source having LEDs, and arranged at a side of the transparent plate to emit light into the transparent plate.

Preferably, any of the above backlight apparatuses may further comprise a diffuser plate placed above the transparent plate.

Preferably, each of the first and second light sources may comprise a plurality of LEDs which are arranged in line.

Preferably, the scattering patterns may comprise one selected from the group consisting of an ink dot, a microscopic roughened structure and a Lambertian pattern.

Preferably, the reflective plate may comprise a Lambertian surface.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 3:
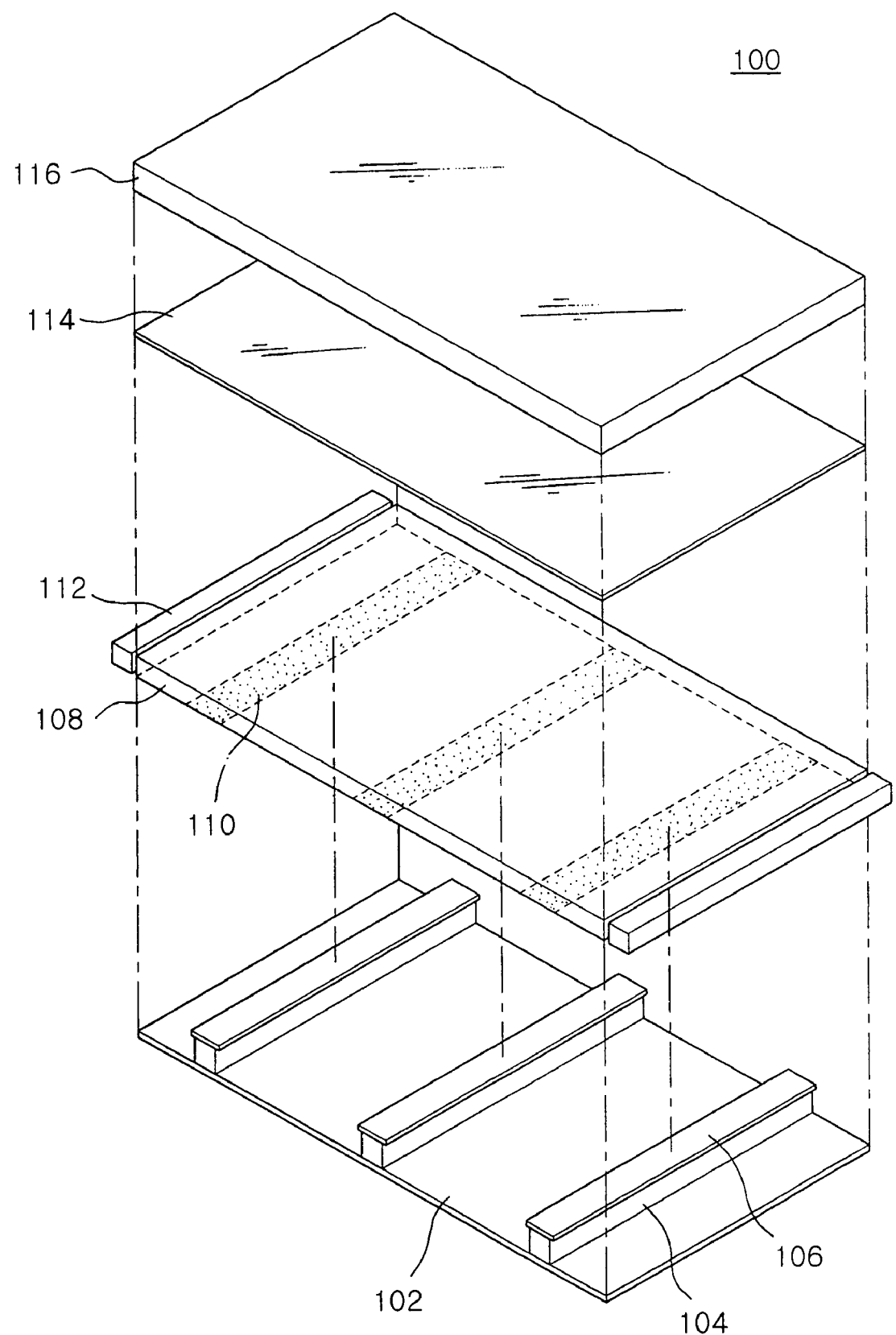
FIG. 3 is an exploded perspective view of a backlight apparatus according to a first embodiment of the invention.
Figure 4:
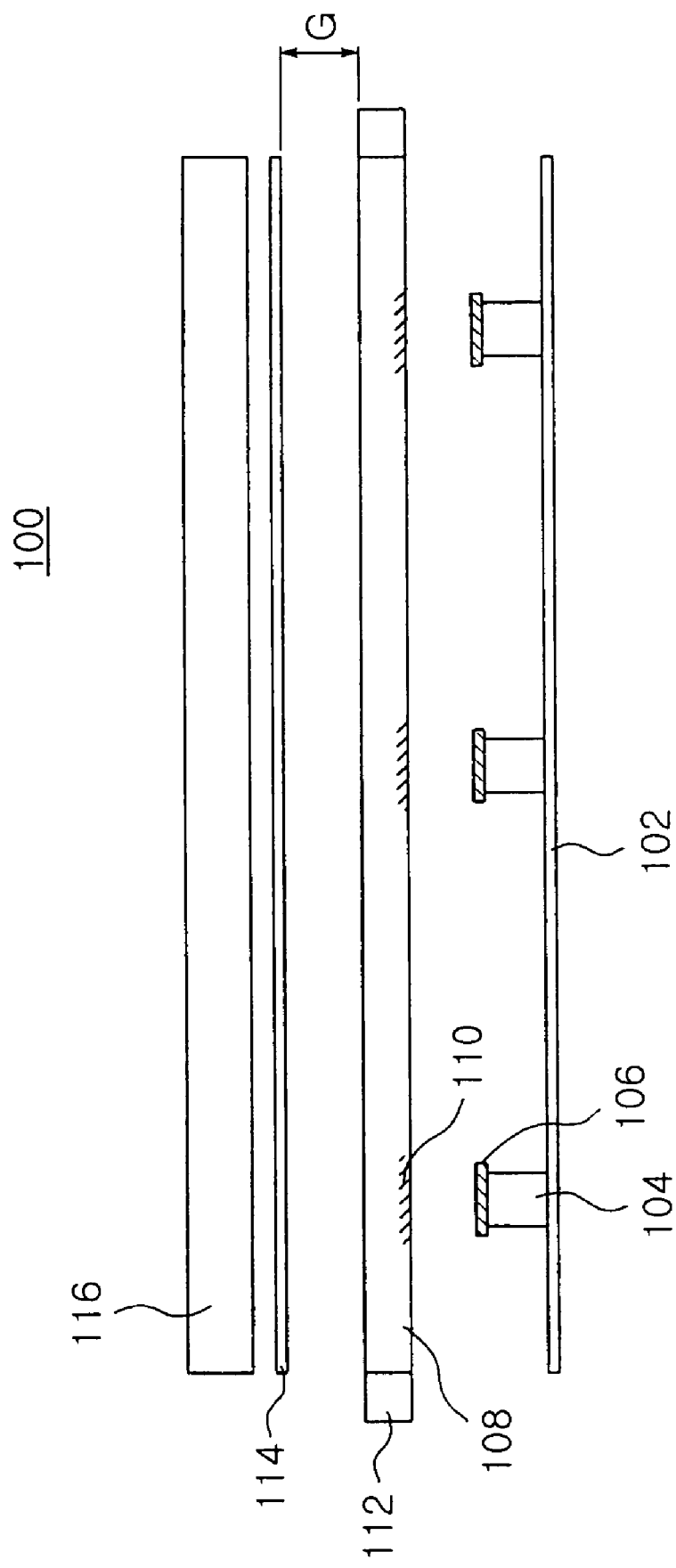
FIG. 4 is a schematic cross-sectional view of the backlight apparatus according to the first embodiment of the invention.
Figure 5:
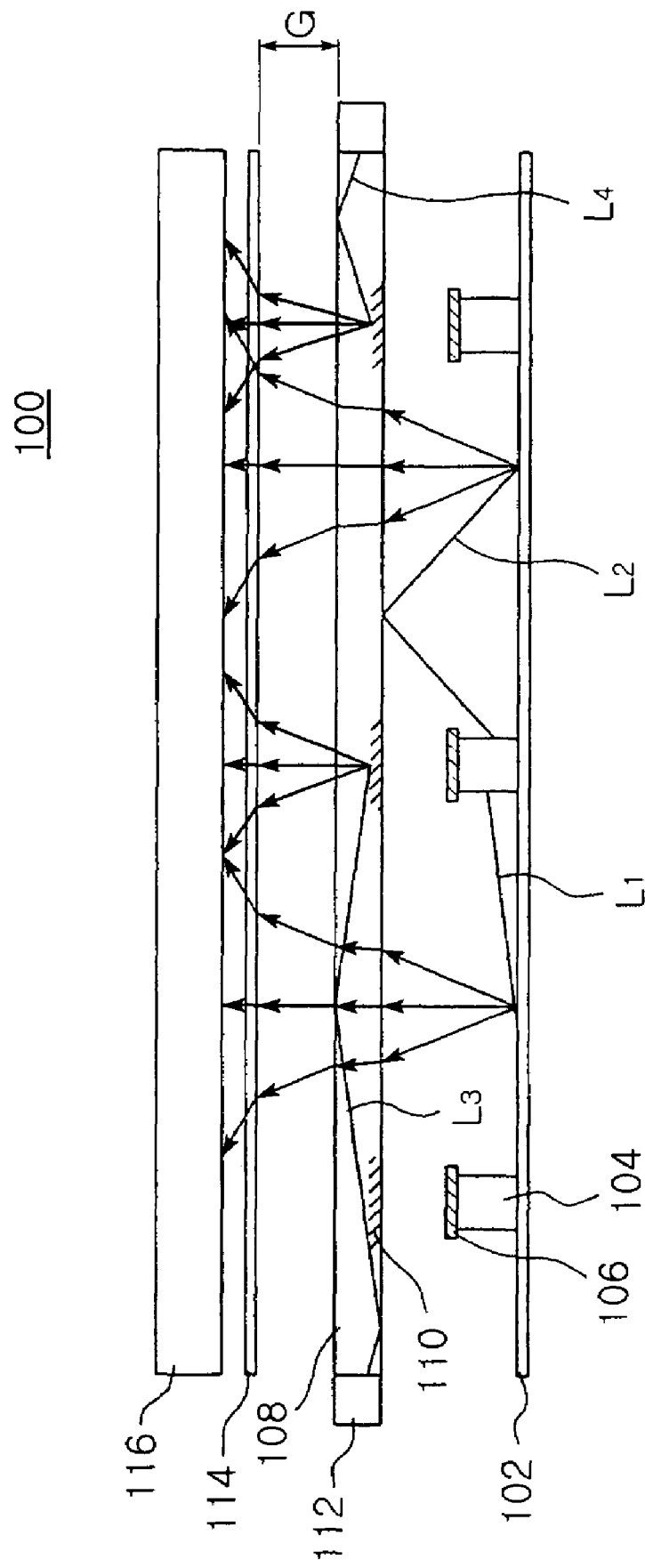
FIG. 5 is a schematic cross-sectional view illustrating the operation of the backlight apparatus according to the first embodiment of the invention.

A backlight apparatus according to a first embodiment of the invention will be first described with reference to FIGS. 3 to 5, in which FIG. 3 is an exploded perspective view of a backlight apparatus according to a first embodiment of the invention, FIG. 4 is a schematic cross-sectional view of the backlight apparatus according to the first embodiment of the invention, and FIG. 5 is a schematic cross-sectional view illustrating the operation of the backlight apparatus according to the first embodiment of the invention.

A backlight apparatus 100 according to the first embodiment of the invention is used for a large-sized LCD, and placed under an LCD panel 116 to backlight the same.

The backlight apparatus 110 includes a sheet-shaped reflective plate 102 placed on a substrate or aboard (not shown), a plurality of bar-shaped first LED light sources 104 placed on the reflective plate 102, a plurality of light shades 106 placed on the first LED light sources 106, respectively, a transparent plate 108 placed above the light shades 106, scattering patterns 110 formed in the bottom of the transparent plate 108 in positions corresponding to the light shades 106 and bar-shaped second LED light sources 112 placed at sides of the transparent plate 108 to emit light into the transparent plate 108.

The reflective plate 102 is generally placed on the substrate, and shaped as a thin film or sheet. Preferably, the reflective plate 102 has a Lambertian surface.

The first LED light sources 104 each include a plurality of LEDs arranged in line, and are configured to emit light generated by the LEDs in a lateral direction. Thus, it is preferred that the first LED light sources 104 utilize LED lenses which are designed to laterally direct light from the LEDs. While three of the first LED light sources 104 have been illustrated in this embodiment, this is an example, but the first LED light sources 104 may be provided in various numbers such as 2, 4 or more.

The light shades 104 are attached to the top of the first LED light sources 104 to reflect light which propagates upward from the first LED light sources 104. The light shades 104 each are a sheet-shaped member, and preferably made of high reflectivity material. Generally, the light shades 104 are made of high reflectivity metal.

The transparent plate 108 comprises a flat member made of for example transparent acryl or polymethylmethacrylate (PMMA) at a uniform thickness, and is spaced from the light shades 106 to a predetermined gap. Alternatively, the transparent plate 108 may be stacked on the first LED light sources 104 with the light shades 106 being interposed between the transparent plate 108 and the LED light sources 104.

The scattering patterns 110 are formed in the bottom of the transparent plate 108 in positions corresponding to the light shades 106. The scattering patterns 110 may comprise preferably ink dots or microscopic roughened structures by which light propagating within the transparent plate 108 can be reflected upward. Alternatively, instead of the scattering patterns 110, Lambertian patterns may be formed in the bottom of the transparent plate 108 in positions corresponding to the scattering patterns 110.

In the meantime, while a space between the reflective plate 102 and the transparent plate 108 is illustrated opened for the convenience's sake, high reflectivity side-walls are generally provided to prevent light from laterally leaking out of this space.

The second LED light sources 112 each include a plurality of LEDs arranged in line, and are generally placed at both sides of the transparent plate 108 to emit light into the transparent plate 108. Of course, a single one of the second LED light source 112 may be arranged at a longer side of the transparent plate 108.

A thin diffuser plate 114 is further placed above the transparent plate 108 at a predetermined gap G. The diffuser plate 114 is generally made of a film or a thin sheet having excellent diffusibility to achieve uniform spatial distribution of light thereby maintaining the entire lightness of the LCD panel 116 uniform as well as to minimize transmission loss.

Figure 1:
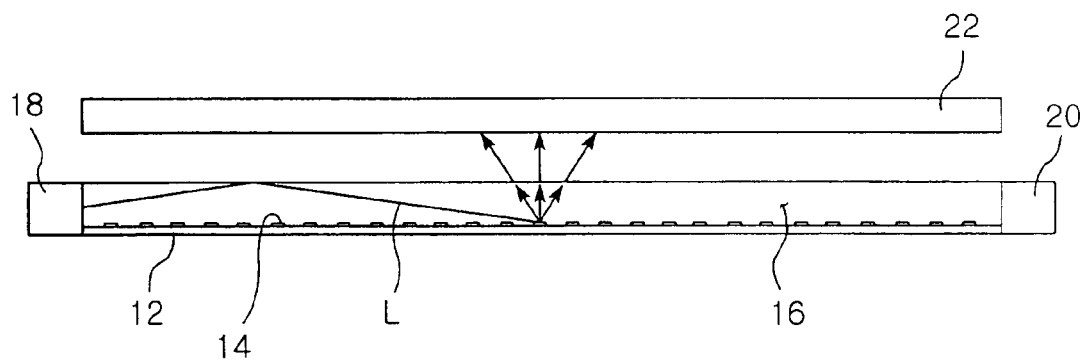
FIG. 1 is a schematic cross-sectional view of a conventional side-emitting backlight apparatus.
Figure 2:
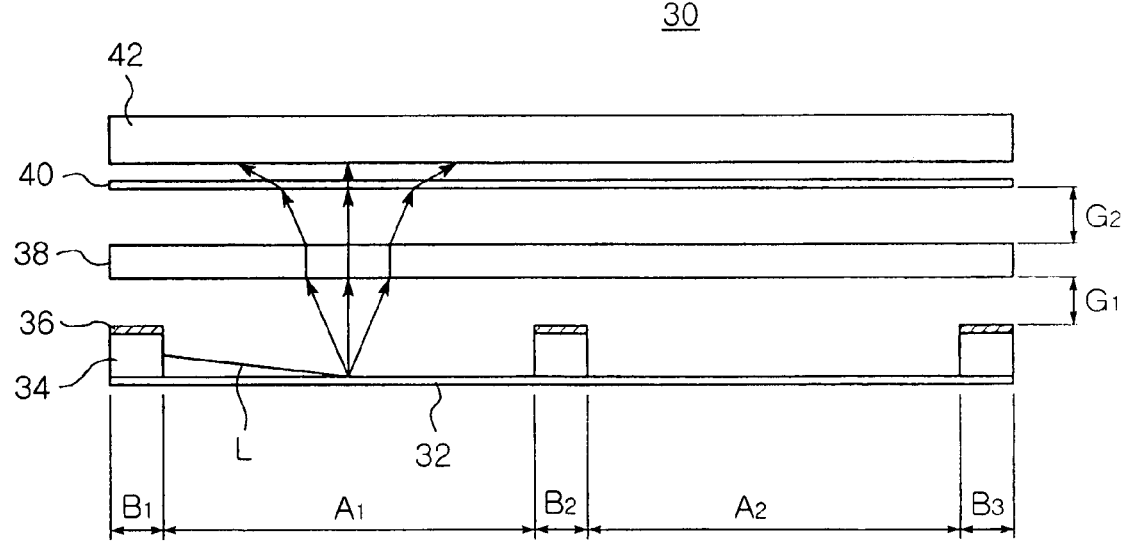
FIG. 2 is a schematic cross-sectional view of a conventional direct-illumination backlight apparatus.

In this case, light beams L3 and L4 reflected from the reflective plate 102 brighten specific areas between light beams L1 and L2, which correspond to the dark areas of the second areas B1, B2 and B3 of the conventional direct illumination backlight apparatus, so as to remarkably enhance the entire uniformity of light emitted from the transparent plate 108. This as a result makes the gap between the transparent plate 108 and the diffuser plate 114 significantly smaller than the gap G2 of the prior art as shown in FIG. 2.

The operation of the backlight apparatus 100 according to the first embodiment of the invention will now be described with reference to FIG. 5.

As shown in FIG. 5, as one of the first LED light sources 104 laterally emit light beams L1 and L2, the light beam L1 after being reflected directly from the reflective plate 102 enters the transparent plate 108 above the reflective plate 102, passes through the transparent plate 108, and reaches the diffuser plate 114. The light beam L2 reflected from the underside of the transparent plate 108 is again reflected upward from the reflective plate 102 and reaches the diffuser plate 114 through the transparent plate 108. This process is similar to that of a typical direct illumination backlight apparatus.

In the meantime, as the second LED light sources 112 emit light beams L3 and L4 into the transparent plate 108, the light beams L3 and L4 propagate through the transparent plate 108 reflecting from top and bottom surfaces of the transparent plate 108. When the light beams L3 and L4 are incident onto the scattering pattern 110, they are reflected upward, and then enter the transparent plate 114.

As described above, the scattering patterns 110 are formed in predetermined positions corresponding to the dark areas of the second areas B1 to B3 of the conventional direct illumination backlight apparatus to compensate the second areas B1 to B3 for relatively weak lightness, thereby enhancing the uniformity of light emitted upward from the transparent plate 108. As a result, the gap G necessary for mixing light emitted from the transparent plate 108 is significantly reduced compared to that of the conventional direct illumination backlight apparatus as shown in FIG. 2. This also brings an effect of reducing the entire thickness of the backlight apparatus 100.

Figure 6:
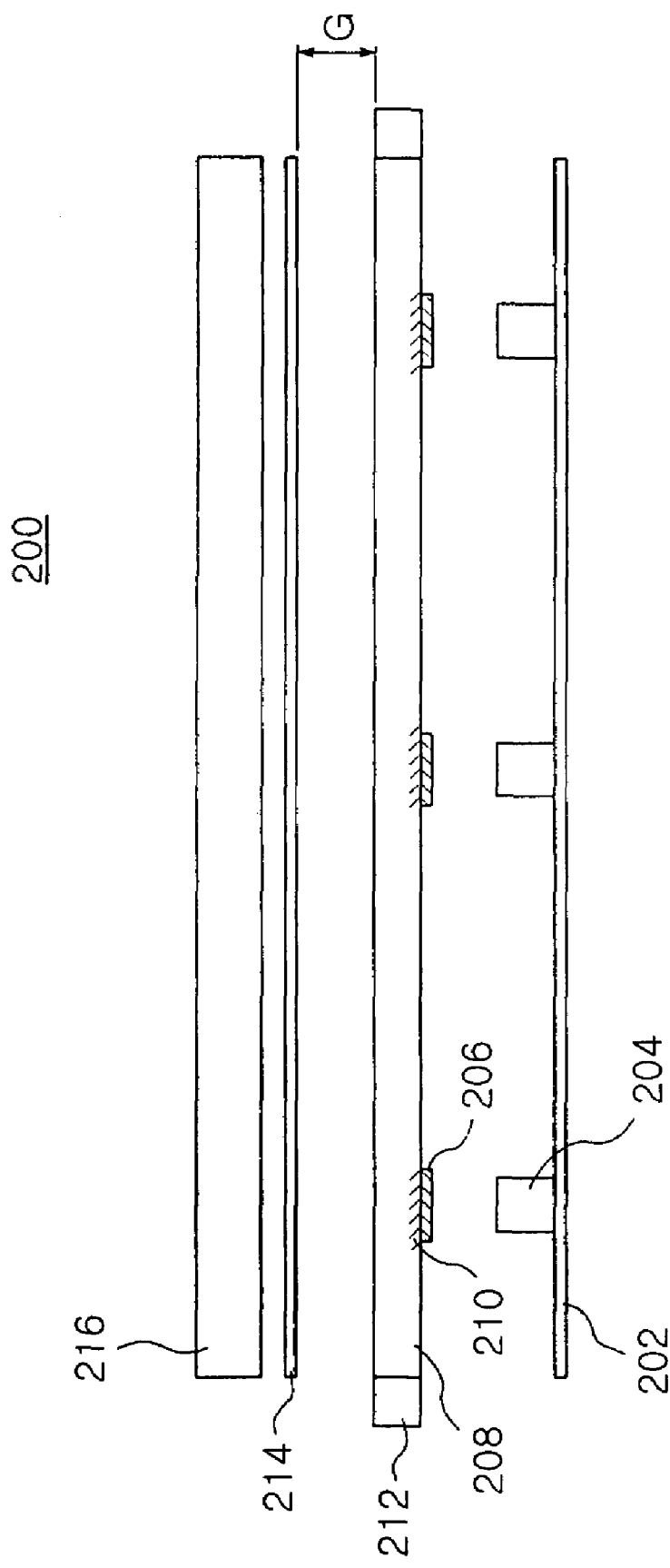
FIG. 6 is a schematic cross-sectional view of a backlight apparatus according to a second embodiment of the invention.
Figure 7:
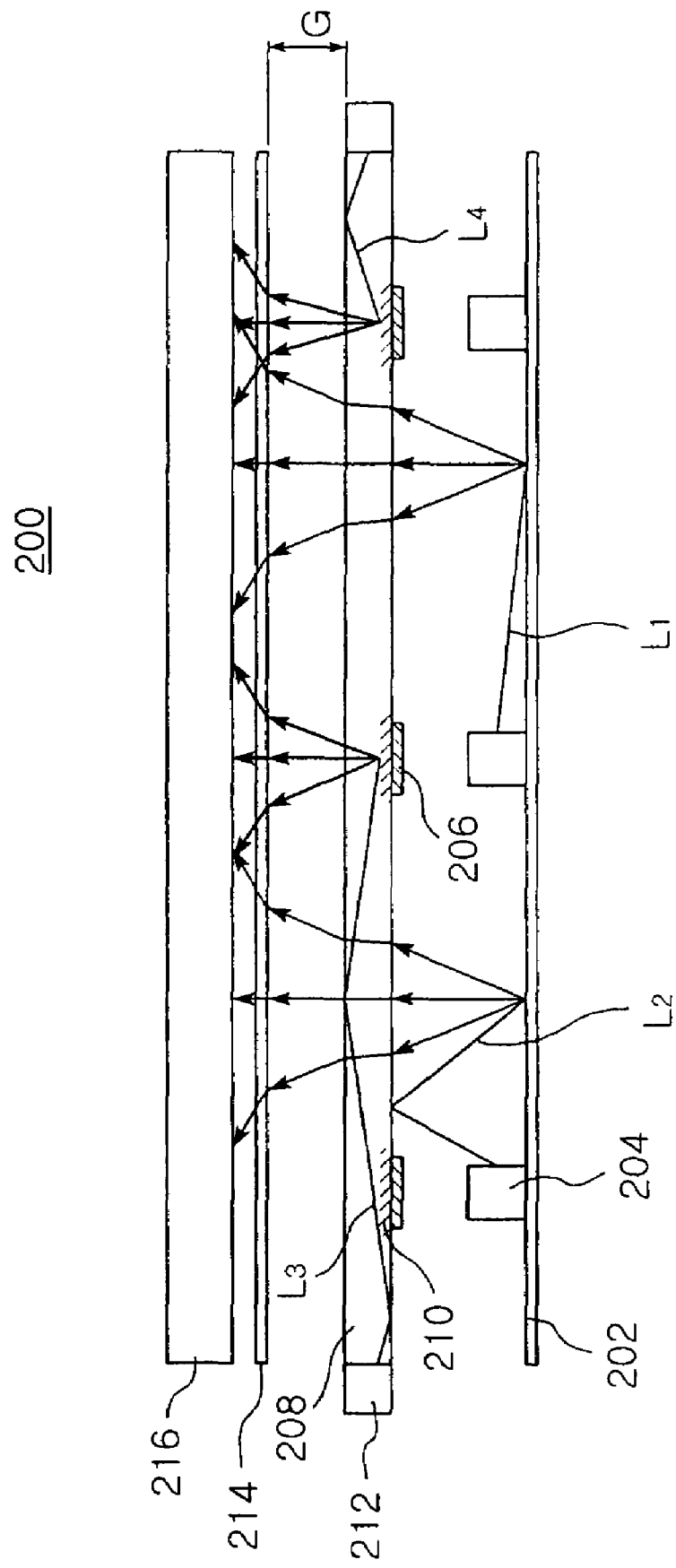
FIG. 7 is a schematic cross-sectional view illustrating the operation of the backlight apparatus according to the second embodiment of the invention.

A backlight apparatus according to a second embodiment of the invention will now be described with reference to FIGS. 6 and 7, in which FIG. 6 is a schematic cross-sectional view of a backlight apparatus according to a second embodiment of the invention, and FIG. 7 is a schematic cross-sectional view illustrating the operation of the backlight apparatus according to the second embodiment of the invention.

A backlight apparatus 200 according to the second embodiment of the invention is used for a large-sized LCD, and placed under an LCD panel 216 to backlight the same.

The backlight apparatus 200 includes a sheet-shaped reflective plate 202 placed on a substrate or a board (not shown), a plurality of bar-shaped first LED light sources 204 placed on the reflective plate 202, a transparent plate 208 placed above the first LED light sources 204 at a predetermined gap, scattering patterns 210 formed in the bottom of the transparent plate 208 in positions corresponding to the first LED light sources 204, a plurality of light shades 206 attached to the underside of the transparent plate 208, respectively, and bar-shaped second LED light sources 212 placed at sides of the transparent plate 208 to emit light into the transparent plate 208.

The reflective plate 202 is generally placed on the substrate, and shaped as a thin film or sheet. Preferably, the reflective plate 202 has a Lambertian surface.

The first LED light sources 204 each include a plurality of LEDs arranged in line, and are configured to emit light generated by the LEDs in a lateral direction. Thus, it is preferred that the first LED light sources 204 utilize LED lenses which are designed to laterally direct light from the LEDs. While three of the first LED light sources 204 have been illustrated in this embodiment, this is an example, but the first LED light sources 204 may be provided in various numbers such as 2, 4 or more.

The light shades 206 are attached to the underside of the transparent plate 208 in positions corresponding to the first LED light sources 204 in order to reflect light which propagates upward from the first LED-light sources 204. The light shades 204 each are a sheet-shaped member, and preferably made of high reflectivity material. Generally, the light shades 204 are made of high reflectivity metal. In addition, since the light shades 206 are spaced from the first LED light sources 204, the light shades 206 preferably have a surface area larger than the upper surface of the first LED light sources 204.

The transparent plate 208 comprises a flat member made of for example transparent acryl or polymethylmethacrylate (PMMA) at a uniform thickness, and is spaced from the first LED light sources 204 to a predetermined gap. Alternatively, the transparent plate 208 may be stacked on the first LED light sources 204 with the light shades 206 being interposed between the transparent plate 208 and the LED light sources 204.

The scattering patterns 210 are formed in the bottom of the transparent plate 208 in positions corresponding to the first LED light sources 204. The scattering patterns 210 may comprise preferably ink dots or microscopic roughened structures by which light propagating within the transparent plate 208 can be reflected upward. Alternatively, instead of the scattering patterns 210, Lambertian patterns may be formed in the bottom of the transparent plate 208 in positions corresponding to the scattering patterns 210.

In the meantime, while a space between the reflective plate 202 and the transparent plate 208 is illustrated opened for the convenience's sake, high reflectivity side-walls are generally provided to prevent light from laterally leaking out of this space.

The second LED light sources 212 each include a plurality of LEDs arranged in line, and are generally placed at both sides of the transparent plate 208 to emit light into the transparent plate 208. Of course, a single one of the second LED light source 212 may be arranged at a longer side of the transparent plate 208.

A thin diffuser plate 214 is further placed above the transparent plate 208 at a predetermined gap G. The diffuser plate 214 is generally made of a film or a thin sheet having excellent diffusibility to achieve uniform spatial distribution of light thereby maintaining the entire lightness of the LCD panel 216 uniform as well as to minimize transmission loss.

In this case, light beams L3 and L4 reflected from the reflective plate 202 brighten specific areas between light beams L1 and L2, which correspond to the dark areas of the second areas B1, B2 and B3 of the conventional direct illumination backlight apparatus, so as to remarkably enhance the entire uniformity of light emitted from the transparent plate 208. This as a result makes the gap between the transparent plate 208 and the diffuser plate 214 significantly smaller than the gap G2 of the prior art as shown in FIG. 2.

The operation of the backlight apparatus 200 according to the second embodiment of the invention will now be described with reference to FIG. 7.

As shown in FIG. 7, as one of the first LED light sources 204 laterally emit light beams L1 and L2, the light beam L1 after being reflected directly from the reflective plate 202 enters the transparent plate 208 above the reflective plate 202, passes through the transparent plate 208, and reaches the diffuser plate 214. The light beam L2 reflected from the underside of the transparent plate 208 is again reflected upward from the reflective plate 202 and reaches the diffuser plate 214 through the transparent plate 208. This process is similar to that of a typical direct illumination backlight apparatus.

In the meantime, as the second LED light sources 212 emit light beams L3 and L4 into the transparent plate 208, the light beams L3 and L4 propagate through the transparent plate 208 reflecting from top and bottom surfaces of the transparent plate 208. When the light beams L3 and L4 are incident onto the scattering pattern 210, they are reflected upward, and then enter the transparent plate 214.

In this case, as described above, the scattering patterns 210 are formed in predetermined positions corresponding to the dark areas of the second areas B1 to B3 of the conventional direct illumination backlight apparatus to compensate the second areas B1 to B3 for relatively weak lightness, thereby enhancing the uniformity of light emitted upward from the transparent plate 208. As a result, the gap G necessary for mixing light emitted from the transparent plate 208 is significantly reduced compared to that of the conventional direct illumination backlight apparatus as shown in FIG. 2. This also brings an effect of reducing the entire thickness of the backlight apparatus 200.

As described hereinbefore, the backlight apparatus of the invention has light sources arranged at a side of a transparent plate, which is generally used in a typical direct illumination backlight apparatus, in order to prevent the formation of dark areas as a chronical problem of the prior art, thereby enhancing the entire uniformity of light. In this way, the backlight apparatus can be maintained thin even when applied to a large-sized LCD.

While the present invention has been shown and described in connection with the preferred embodiments, it will be apparent to those skilled in the art that modifications and variations can be made without departing from the spirit and scope of the invention as defined by the appended claims.

What is claimed is:

1. A backlight apparatus arranged under a Liquid Crystal Display (LCD) panel to illuminate the LCD panel, comprising:
   a reflective plate;
   a plurality of bar-shaped first light sources each having Light Emitting Diodes (LEDs), and arranged on the reflective plate to emit light generated by the LEDs in a lateral direction;
   a plurality of light shades arranged above the first light sources;
   a transparent plate placed above the light shades;
   scattering patterns formed in the bottom of the transparent plate in positions corresponding to the light shades; and
   a bar-shaped second light source having LEDs, and arranged at a side of the transparent plate to emit light into the transparent plate.

2. The backlight apparatus according to claim 1, wherein the light shades are attached to top of the first light sources, and the transparent plate is spaced from the light shades to a predetermined gap.

3. The backlight apparatus according to claim 1, wherein the light shades are attached to the bottom of the transparent plate, and the transparent plate is spaced from the first light sources to a predetermined gap.

4. The backlight apparatus according to claim 1, wherein the first light sources, the light shades and the transparent plates are stacked one atop another in their order.

5. The backlight apparatus according to claim 1, further comprising a diffuser plate placed above the transparent plate.

6. The backlight apparatus according to claim 1, wherein each of the first and second light sources comprises a plurality of LEDs which are arranged in line.

7. The backlight apparatus according to claim 1, wherein the scattering patterns comprise one selected from the group consisting of an ink dot, a microscopic roughened structure and a Lambertian pattern.

8. The backlight apparatus according to claim 1, wherein the reflective plate comprises a Lambertian surface.

9. A backlight apparatus arranged under a Liquid Crystal Display (LCD) panel to illuminate the LCD panel, comprising:
   a reflective plate;
   a plurality of bar-shaped first light sources each having Light Emitting Diodes (LEDs), and arranged on the reflective plate to emit light generated by the LEDs in a lateral direction;
   a plurality of light shades attached to the top of the first light sources, respectively;
   a transparent plate placed above the light shades;
   scattering patterns formed in the bottom of the transparent plate in positions corresponding to the light shades; and
   a bar-shaped light second source having LEDs, and arranged at a side of the transparent plate to emit light into the transparent plate.

10. The backlight apparatus according to claim 9, further comprising a diffuser plate placed above the transparent plate.

11. The backlight apparatus according to claim 9, wherein each of the first and second light sources comprises a plurality of LEDs which are arranged in line.

12. The backlight apparatus according to claim 9, wherein the scattering patterns comprise one selected from the group consisting of an ink dot, a microscopic roughened structure and a Lambertian pattern.

13. The backlight apparatus according to claim 9, wherein the reflective plate comprises a Lambertian surface.

14. A backlight apparatus arranged under a Liquid Crystal Display (LCD) panel to illuminate the LCD panel, comprising:
   a reflective plate;
   a plurality of bar-shaped first light sources each having Light Emitting Diodes (LEDs), and arranged on the reflective plate to emit light generated by the LEDs in a lateral direction;
   a transparent plate placed above the first light sources;
   scattering patterns formed in the bottom of the transparent plate in positions corresponding to the first light sources;
   a plurality of light shades attached to the underside of the scattering patterns, respectively; and a bar-shaped second light source having LEDs, and arranged at a side of the transparent plate to emit light into the transparent plate.

15. The backlight apparatus according to claim 14, further comprising a diffuser plate placed above the transparent plate.

16. The backlight apparatus according to claim 14, wherein each of the first and second light sources comprises a plurality of LEDs which are arranged in line.

17. The backlight apparatus according to claim 14, wherein the scattering patterns comprise one selected from the group consisting of an ink dot, a microscopic roughened structure and a Lambertian pattern.

18. The backlight apparatus according to claim 14, wherein the reflective plate comprises a Lambertian surface.

* * * * *